Figure 9:
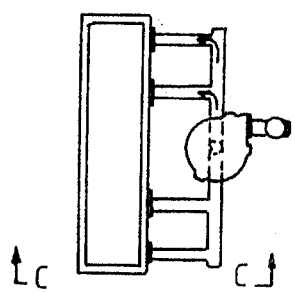

United States Patent [19]

Walker

[11] Patent Number: 4,580,544

[45] Date of Patent: Apr. 8, 1986

[54] FUEL/AIR MIXING USING SWIRL CHAMBER

[76] Inventor: Frank G. B. Walker, 44 Greers Road, Christchurch, New Zealand

[21] Appl. No.: 675,122

[22] Filed: Nov. 27, 1984

Related U.S. Application Data

[63] Continuation-in-part of Ser. No. 560,927, Dec. 13, 1982, abandoned, which is a continuation-in-part of Ser. No. 370,074, Apr. 20, 1982, abandoned, which is a continuation-in-part of Ser. No. 306,473, Sep. 28, 1981, abandoned.

[30] Foreign Application Priority Data

Nov. 7, 1983 [NZ] New Zealand .................. 210134

[51] Int. Cl.$^4$ .................................. F02M 29/04
[52] U.S. Cl. .............................. 123/590; 123/188 M; 123/593; 123/306; 123/549; 48/189
[58] Field of Search ............. 123/590, 188 M, 545, 123/306, 549, 593; 48/180.1, 189.2, 189.4

[56] References Cited

U.S. PATENT DOCUMENTS

| | | | |
|---|---|---|---|
| 2,864,355 | 12/1958 | Woodworth, Jr. | 123/545 |
| 3,146,768 | 9/1964 | Osborne | 123/590 |
| 4,318,386 | 3/1982 | Showalter et al. | 123/590 |

FOREIGN PATENT DOCUMENTS

| | | | |
|---|---|---|---|
| 78902 | 5/1983 | European Pat. Off. | 123/590 |
| 868282 | 12/1941 | France | 123/590 |
| 2398189 | 3/1979 | France | 123/590 |
| 835497 | 6/1981 | U.S.S.R. | 123/306 |

Primary Examiner—E. Rollins Cross
Attorney, Agent, or Firm—Holman & Stern

[57] ABSTRACT

An air/fuel homogenizing device for use downstream of a carburetor and upstream of the intake to an internal combustion engine to more effectively homogenize and/or otherwise improve the entrainment of the fuel in the air stream from the carburetor comprises, a swirl chamber into which the air/fuel mix enters tangentially of the swirl to be created therein and from which it exits axially of the swirl created therein the boundary or at least a portion thereof against which the swirling fuel-/air mix impinges or passes being heated to a temperature, above ambient temperature or at least the temperature of the fuel/air mix to assist in vaporization by the use of a fluid jacket which receives either exhaust gases or coolant from the engine and a fuel particle size reducing member disposed about the substantially axial exit opening from the swirl chamber through which reducing means the air/fuel mix passes to exit the chamber. The particle size reducing member extends substantially the full axial extent of the swirl chamber, is an exit opening surrounding member selected from a mesh member and a perforated member and/or is substantially cylindrical in its outer appearance but includes inwardly directed baffle members internally thereof. The invention also comprises a combination of an engine and the air/fuel homogenizing device and an air/fuel mixing device such as a carburetor or a fuel injector.

13 Claims, 20 Drawing Figures

FUEL/AIR MIXING USING SWIRL CHAMBER

This application is a continuation-in-part of U.S. Ser. No. 06/560,927 filed Dec. 13, 1983, now abandoned, which is a continuation-in-part of U.S. Ser. No. 06/370,074 filed Apr. 20, 1982, now abandoned, which is a continuation-in-part of U.S. Ser. No. 06/306,473 filed Sept. 28, 1981, also abandoned.

BACKGROUND OF THE INVENTION

1. Field of the Invention

This invention relates to an air/fuel homogenizing device for use downstream of an air/fuel mixing device such as a carburetor or fuel injector and upstream of the intake of an I.C. engine to more effectively homogenize the entrainment of the fuel in the air stream.

2. Description of the Prior Art

Many forms of fuel systems have been devised to enhance the degree of homogeneity of entrainment of a liquid fuel in the air stream for feeding to an internal combustion engine. Such systems can include means for heating a fuel and/or air or can include devices for providing a turbulent flow in the air/fuel flow e.g. a mesh or the like barrier through which the fuel must travel in a turbulent flow to thus ensure a better homogeneity of the air/fuel mix. Such systems however have the defect in that while they work to some extent with a volatile fuel such as petrol they do not lend themselves readily to a less volatile liquid fuel such as methanol. Obviously also any system that works well with a less volatile fuel without any significant impairment on the air flow may also have application in a petrol powered engine.

It is therefore an object of the present invention to provide means and/or methods which will go at least some way to meet the abovementioned desiderata.

SUMMARY OF THE INVENTION

In one aspect the present invention consists in an air/fuel homogenizing means for use downstream of an air/fuel mixing device such as a carburetor or a fuel injector and upstream of the intake of an internal combustion engine to more effectively homogenize the entrainment of the fuel in the air stream from said air/fuel mixing device, said means comprising:

means defining a substantially cylindrical chamber generally bounded by a substantially cylindrical surface and opposed end surfaces substantially generally normal to the axis of said substantially cylindrical surface, said means defining a chamber including with respect to the axis of said substantially cylindrical surface a substantially axial exit opening through one end surface, said means being further characterized in including an inlet into said chamber providing a passageway which is substantially tangential as it merges into the substantially cylindrical surface, means defining a fluid jacket about said means defining a chamber so as to transfer heat through to at least a significant proportion of said substantially cylindrical surface, said means defining a fluid jacket having an inlet and an outlet thereto, and fuel particle size reducing means disposed about said substantially axial exit opening through which air/fuel can pass to said exit opening, the construction being such that in use a hot fluid selected from coolant water and exhaust gases passes into and out of the fluid jacket via the inlet and outlet thereof respectively thereby heating the substantially cylindrical surface of said means defining a chamber and said air/fuel mix from a said air/fuel mixing device in use enters into said chamber tangentially with respect to said substantially cylindrical surface via the inlet providing a passageway to thereby swirl about the substantially cylindrical chamber deriving heat from said substantially cylindrical surface as it swirls towards the substantially axial exit opening via said particle size reducing means which further homogenizes the fuel in the air, the thus better entrained air/fuel mixture exiting from said axial exit opening into the engine intake.

Preferably said means defining a chamber includes a larger opening in an end surface than said substantially axial exit opening and there is provided a cover member peripherally sealed about said opening.

Preferably said means defining a chamber and said means defining a fluid jacket save for the cover member and for any plugging members necessitated by the molding process are formed as a single molded article.

Preferably said particle size reducing means extends substantially from one end surface to the other end surface of said chamber.

Preferably said particle size reducing means is an exit opening surrounding memeber selected from a mesh member and a perforated member.

Preferably the particle size reducing means is substantially cylindrical in its outer appearance but includes inwardly directed baffle members internally thereof.

In a further aspect the present invention consists in in combination, an internal combustion engine, an air/fuel homogenizing means upstream of the internal combustion engine and an air/fuel mixing device such as a carburetor or a fuel injector upstream of said air/fuel homogenizing means, said air/fuel homogenizing means comprising, means defining a substantially cylindrical chamber generally bounded by a substantially cylindrical surface and opposed end surfaces substantially generally normally to the axis of said substantially cylindrical surface, said means defining a chamber including with respect to the axis of said substantially cylindrical surface a substantially axial exit opening through one end surface, said means being further characterized in including an inlet into said chamber providing a passageway which is substantially tangential as it merges into the said substantially cylindrical surface, means defining a fluid jacket about said means defining a chamber so as to transfer heat through to at least a significant proportion of said substantially cylindrical surface, said means defining a fluid jacket having an inlet and an outlet thereto, and fuel particle size reducing means disposed about said substantially axial exit opening through which air/fuel can pass to said exit opening, the construction being such that in use a hot fluid selected from coolant water and exhaust gases from said engine passes into and out of the fluid jacket via the inlet and outlet thereof respectively thereby heating the substantially cylindrical surface of said means defining a chamber and the air/fuel mix from said air/fuel mixing device in use enters into said chamber tangentially with respect to said substantially cylindrical surface via the inlet providing a passageway to thereby swirl about the substantially cylindrical chamber deriving heat from said substantially cylindrical surface as it swirls towards the substantially axial exit opening via said particle size reducing means which further homogenizes the fuel in the air, the thus better entrained air/fuel mixture exiting from said axial exit opening into the engine intake and from thence the engine.

BRIEF DESCRIPTION OF THE DRAWINGS

One preferred form of the present invention will now be described with reference to the accompanying drawings wherein:

FIG. 1 is a cross-sectional view of air/fuel homogenizing means in accordance with the present invention taken along line I—I of FIG. 2 showing with arrows the movement of the air/fuel mix tangentially into the substantially cylindrical swirl chamber through the passageway which merges therewith, about the particle reducing means through which it ultimately passes down through the axial opening shown in the drawing, the surface defining the substantially cylindrical surface of the swirl chamber being on a wall forming part of a jacket having an inlet and exit through which a hot fluid such as coolant water (preferably) or exhaust gases can pass;

FIG. 2 is a cross-sectional view taken along line II—II of FIG. 1 showing the complete air/fuel homogenizing means and the perforated nature of the plate from which the particle size reducing means is preferably made and how, in the preferred form of the present invention, it is of such a dimension that it can be passed into the swirl chamber to surround the substantially axial exit opening via a larger opening which ultimately can be sealed;

FIG. 3 is a cross-sectional view taken along line III—III of FIG. 2 of the particle reducing means shown in FIGS. 1 and 2 showing how the same can be formed from a single cylinder of gauze, perforated plate or mesh so as to have a substantially cylindrical (this includes multi-faceted shapes) which does not interfere to any substantial degree with the swirl movmement within the swirl chamber yet still has inwardly directed vanes or the like which act in the manner of baffles or the like to ensure an enhancement of the particle size breaking up as the flow substantially changes from a swirl into an axial flow out of the axial exit opening;

FIG. 4 is a reduced perspective view of the preferred form of particle size reducing means;

FIG. 5 is a perspective view of the air/fuel homogenizing means but not showing the particle size reducing means, it being seen how the same can be largely molded as a single piece;

FIG. 6 is a substantially reverse perspective view to that of FIG. 5;

FIG. 7 is another perspective view of the axial exit opening side of the apparatus of FIGS. 5 and 6;

FIG. 8 is another perspective view of the apparatus of FIGS. 5 to 7 but showing that opening of the three openings into the water jacket which is plugged (as in FIG. 1), the particular opening being the third of three to support the core of the jacket during a molding process;

FIG. 9 is a top plan view of an inline four cylinder engine with a standard manifold having a swirl chamber mounted thereon such that the air/fuel mix from the carburetor passes into the swirl chamber through a single entrance and exits downwardly into the manifold and can thus lead to the top two cylinders as well as the bottom two cylinders depending of course on the firing sequence and thus intake valve opening sequence of the engine;

FIG. 10 is a view CC of the arrangement shown in FIG. 9,

FIG. 11 is a similar view to that of FIG. 9 but showing an inline four cylinder engine having a swirl chamber interposed on the manifold such that two exits from the swirl chamber are provided so that each exit feeds from the swirl (created by a single entrance from a carburettor or fuel injector) and can direct the flow to any cylinder with which it is in communication;

FIG. 12 is a view DD of the arrangement shown in FIG. 11;

FIG. 13 is a top plan view similar to that of FIGS. 9 and 11 but of an opposed four or six cylinder engine having a standard manifold showing how a single entrance swirl chamber can provide for the single exit therefrom for all the cylinders;

FIG. 14 is a view EE of the arrangement shown in FIG. 13;

FIG. 15 is a similar view to that of FIG. 13 but showing an opposed four or six cylinder engine with a non-standard manifold which allows a swirl chamber having two exits to be interposed on the manifold;

FIG. 16 shows the arrangement of FIG. 15 in the direction FF;

FIG. 17 is a view similar to FIGS. 9, 11, 13 and 15 but of an arrangement for a V-6 or V-8 engine showing how the swirl chamber can be arranged to create a swirl about a vertical axis using one or two swirl chamber entrances (depending on whether there are one or two carburetors or fuel injectors) and showing how the same exits downwardly into the common manifold;

FIG. 18 is a view GG of the arrangement shown in FIG. 17;

FIG. 19 is a view similar to FIG. 17 but showing an inline six cylinder engine with a standard manifold, the arrangement showing a single carburetor feeding an air/fuel stream into the swirl chamber to create a swirl about a vertical axis which then exits downwardly into the manifold so that the flow passes as required to one of the six cylinders; and FIG. 20 is a similar view to FIG. 19 but showing the inline six cylinder engine with a non-standard manifold which enables the two exit swirl chamber in accordance with the present invention to be interposed on the manifold so that each exit supplies as required air/fuel to whatever cylinder is firing.

DETAILED DESCRIPTION

With reference to FIGS. 9 to 20 inclusive it can be seen that the air/fuel homogenizing means in accordance with the present invention is to be situated with one or two exits into manifold structures upstream of an internal combustion engine with the air/fuel homogenizing means receiving an air/fuel stream or streams from an air/fuel mixing means such as a carburetor or fuel injection system. It can be seen from the drawings that some embodiments employ two substantially axial exit openings and/or two means providing an inlet into the substantially cylindrical chamber (i.e. the swirl chamber) each providing a passageway which is substantially tangential as it merges into the substantially cylindrical surface.

As used herein and in the appended claims the term substantially cylindrical surface refers to a surface not inconsistent with the generation of a swirl. It can therefore include circumferentially directed ridges, grooves or the like which do not in any way interfere with the swirl. Additionally or instead it can include other types of variations but with the proviso that it is a surface of a kind that generates a swirl.

Figure 2:
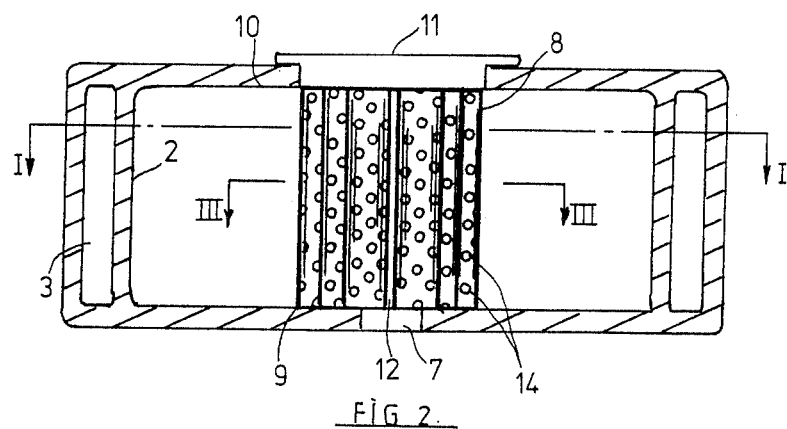
Figure 3:
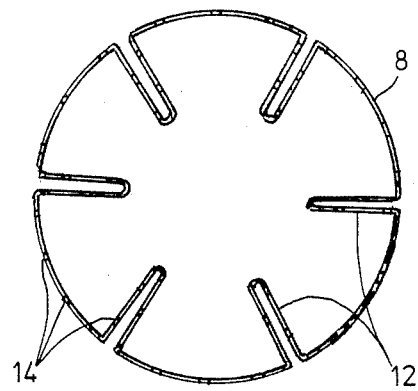
Figure 4:
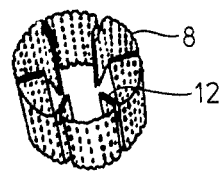
Figure 5:
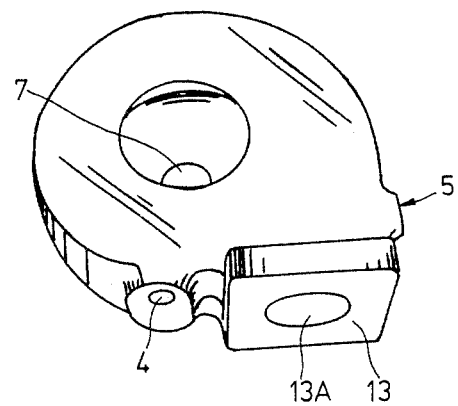
Figure 6:
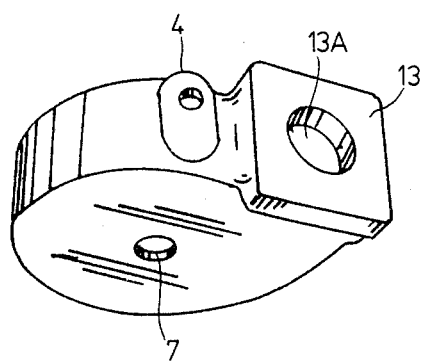
Figure 7:
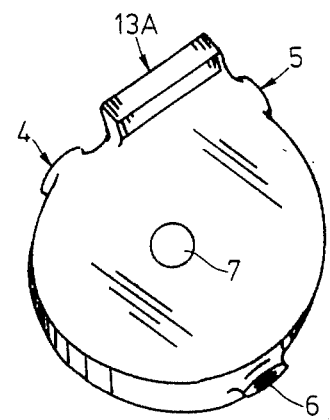
Figure 8:
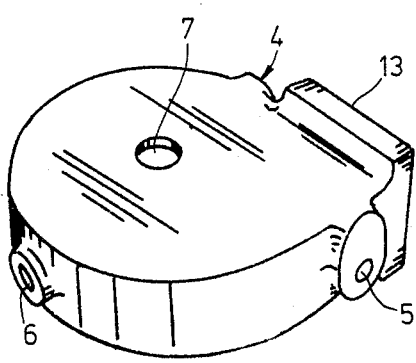
Figure 15:
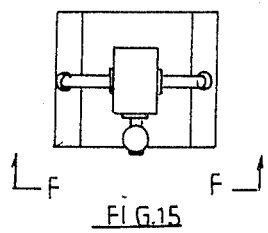
Figure 16:
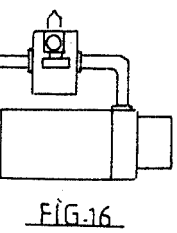
Figure 17:
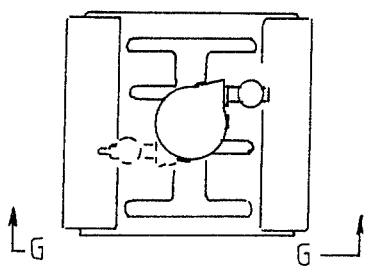
Figure 18:
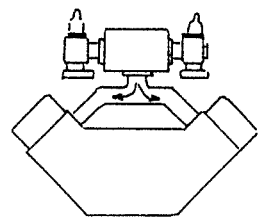
Figure 19:
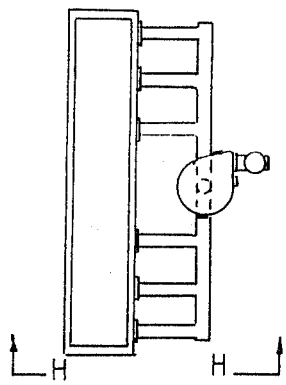
Figure 20:
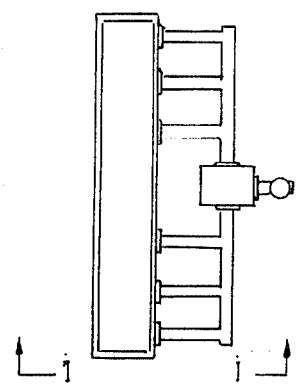

In the preferred forms of the present invention to be hereinafter described, reference will be made to a form of air/fuel homogenizing means that has been cast in aluminium. Obviously other materials can be employed or mixtures thereof employed. Indeed, in the preferred form, while a coolant water jacket is used, there is no reason why the means for providing the jacket needs to be integrally formed with the means providing the cylindrical surface of the swirl chamber. Indeed in some forms of the present invention it is envisaged that separate molded components, for example, split along section line III-III of FIG. 2, could be provided thereby avoiding the need for a cap member as shown in FIG. 2. Such obvious alternative constructions will be readily apparent to a person skilled in the art.

In the preferred form of the present invention, molding 1 is provided which defines a water or exhaust gas jacket disposed in spaced relationship around wall 2 which encloses and defines the swirl chamber and provides the preferred substantially cylindrical surface so as to allow the transferral of heat therethrough. The water coolant or exhaust gas chamber is denoted by reference numeral 3. In order to be able to more easily mold such a shape it can be seen that in addition to inlet or outlet 4 or outlet and inlet 5 an opening 6 which can be plugged as shown in FIG. 1 is used.

The preferred form of the present invention as shown includes a single substantially axial exit opening 7 having disposed thereabout fuel particle reducing means 8 which preferably extends fully from one end 9 to the other 10 of the swirl chamber. Ideally a cap member 11 is provided to allow the positioning of the particle size reducing means 8 and the subsequent sealing thereof, for example, by set screws or the like (not shown) or indeed even adhesives. To ensure the location of the means 8 location means (not shown) can be provided on wall 9, wall 10 or the cover 11. If a double exited version of the present invention is being made then cover member 11 could include therein an axial exit opening or alternatively the wall 10 could define the exit opening but in such a circumstance it would probably be necessary to allow for the opening of the chamber unless the particle reducing member is in the form of, for example, wire wool or the like that can be stuffed inwardly through an opening 7.

The preferred form of particle size reducing means 8 is as shown in FIGS. 1, 2, 3 and 4, i.e. it is preferably formed from a single piece of metal having a plurality of apertures therethrough and shaped so as to provide internal baffles or vanes 12 which will align the flow substantially axially while providing for significant impingement and passage through constricted passageways provided by the plurality of apertures 14 as shown. It is desirable though not essential that the exterior surface of the member 8 be substantially cylindrical so as to not significantly interfere with the swirl until such time as the better mixed and warmed air/fuel mix passes through the openings thereof to thus impinge against the baffle or vane inward extensions 12 which are desirable.

Figure 1:
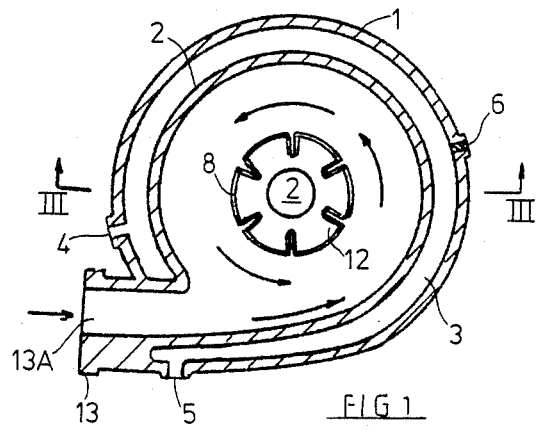
Figure 11:
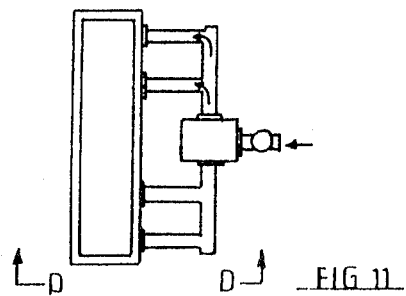
Figure 10:
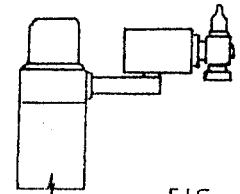
Figure 13:
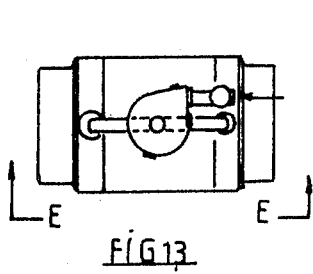
Figure 14:
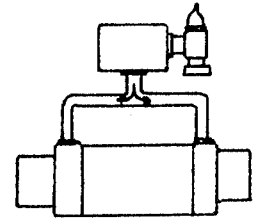
Figure 12:
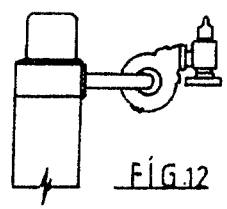

It can be seen that means 13 provides an inlet 13A to the swirl chamber (there can be two or more if necessary) which merges with the substantially cylindrical surface so that a flow as shown by the arrows in FIG. 1 occurs which throws heavier particles of fuel in the air/fuel mix against the heated surface 2. Surface 2 is heated by heat transferred through the wall contacted by coolant water or exhaust gases passing in, for example inlet 4 and out exit 5.

With an arrangement in accordance with the present invention it is found that by the provision of relatively cheap add ons, conventional petrol motor vehicles can derive an improved fuel economy simply for the cost of the air/fuel homogenizing means and certain mountings and couplings therefore, i.e. to pass coolant water into and out of the jacket and to position the carburetor and/or fuel injector upstream of the inlet 13 and to provide manifolds that communicate with the exit opening 7.

Primarily the apparatus of the present invention has been devised to allow petrol engines to employ a less volatile fuel such as methanol. Please note that the apparatus in accordance with the present invention can be used in addition to any means that might be provided to prevent icing of an upstream carburetor.

The apparatus of the invention has been employed on a Mitsubishi Sigma two liter motor vehicle. It has been used in such a way as not to increase the horsepower in order not to void any manufacturer's warranty (but simply to increase fuel efficiency). When used with petrol 26% to 34% increases in efficiency are achieved at normal full power. Similar figures have been obtained for Ford Falcon motor vehicles with 4.1 liter six cylinder engines with mileage being improved from 16–17 to 22–24 miles - imperial gallon in the city.

Greater efficiency still is noted when methanol is used as the fuel over the engine being used with methanol without the fitting of the device. Dual fuel vehicles it is noted will have both petrol and methanol efficiencies increased.

I claim:

1. Air/fuel homogenizing means for use downstream of an air/fuel mixing device such as a carburetor or a fuel injector and upstream of the intake of an internal combustion engine to more effectively homogenize the entrainment of the fuel in the air stream from said air/fuel mixing device, said means comprising:

means defining a substantially cylindrical chamber generally bounded by a substantially cylindrical surface and opposed end surfaces substantially generally normal to the axis of said substantially cylindrical surface, a substantially axial chamber exit opening through at least one end of said end surfaces coaxial with said cylindrical surface axis, and an inlet into said chamber providing a passageway which merges into the substantially cylindrical surface substantially tangential thereto;

means defining a fluid jacket about said chamber defining means to facilitate transfer of heat through at least a significant proportion of said substantially cylindrical surface, and an inlet and an outlet through said fluid jacket defining means; and fuel particle size reducing means disposed about said substantially axial chamber exit opening through which air/fuel can pass to said opening;

the construction being such that in use a hot fluid selected from coolant water and exhaust gases passes into and out of the fluid jacket via the inlet and outlet thereto respectively thereby heating the substantially cylindrical surface of said chamber defining means and said air/fuel mix from said air/fuel mixing device in use enters through said chamber inlet into said chamber tangentially with respect to said substantially cylindrical surface to thereby swirl about the substantially cylindrical surface as it swirls towards the substantially axial chamber exit opening through said particle size reducing means which further homogenizes the fuel in the air, the thus better entrained air/fuel mixture exiting from said axial exit opening into the engine intake.

2. Air/fuel homogenizing means as claimed in claim 1 wherein said means defining a chamber further comprises an opening in one of said end surfaces larger than said substantially axial chamber exit opening, and a cover member peripherally sealed about said larger opening.

3. Air/fuel homogenizing means as claimed in claim 2 wherein said means defining a chamber and said means defining a fluid jacket are comprised of a single molded article.

4. Air/fuel homogenizing means as claimed in claim 1 wherein said particle size reducing means extends substantially from one end surface to the other end surface of said chamber.

5. Air/fuel homogenizing means as claimed in claim 1 wherein said particle size reducing means comprises a mesh member surrounding said at least one axial chamber.

6. Air/fuel homogenizing means as claimed in claim 5 wherein said particle size reducing means has a substantially cylindrical outer surface and inwardly directed baffle members internally thereof.

7. In combination: an internal combustion engine;
an air/fuel homogenizing means upstream of the fuel intake of the internal combustion engine; and
an air/fuel mixing device such as a carburetor or a fuel injector upstream of said air/fuel homogenizing means, said air/fuel homogenizing means comprising,
means defining a substantially cylindrical chamber generally bounded by a substantially cylindrical surface and opposed end surfaces substantially generally normal to the axis of said substantially cylindrical surface, a substantially axial chamber exit opening through at least one of said end surfaces coaxial with said cylindrical surface axis, and
an inlet into said chamber providing a passageway which merges into said substantially cylindrical surface substantially tangential thereto,
means defining a fluid jacket about said chamber defining means to facilitate transfer heat through at least a significant proportion of said substantially cylindrical surface, and an inlet and an outlet through said fluid jacket defining means, and
fuel particle size reducing means disposed about said substantially axial chamber exit opening through which air/fuel can pass to said exit opening, the construction being such that in use a hot fluid selected from coolant water and exhaust gases from said engine passes into and out of the fluid jacket via the inlet and outlet thereto respectively thereby heating the substantially cylindrical surface of said chamber defining means and the air/fuel mix from said air/fuel mixing device in use enters through said chamber inlet into said chamber tangentially with respect to said substantially cylindrical surface to thereby swirl about the substantially cylindrical chamber deriving heat from said substantially cylindrical surface as it swirls towards the substantially axial chamber exit opening through said particle size reducing means which further homogenizes the fuel in the air, the thus better entrained air/fuel mixture exiting from said axial exit opening into the engine intake and from thence to the engine.

8. A combination as claimed in claim 7 wherein said particle size reducing means extend substantially from one end surface to the other end surface of said chamber.

9. A combination as claimed in claim 7 wherein said particle size reducing means comprises a mesh member surrounding said at least one axial chamber.

10. A combination as claimed in claim 7 wherein said particle size reducing means has a substantially cylindrical outer surface and inwardly directed baffle members internally thereof.

11. Air/fuel homogenizing means as claimed in claim 1 wherein said particle size reducing means comprises a perforated member surrounding said at least one axial chamber.

12. Air/fuel homogenizing means as claimed in claim 11 wherein said particle size reducing means has a substantially cylindrical outer surface and inwardly directed baffle members internally thereof.

13. A combination as claimed in claim 7 wherein said particle size reducing means comprises a perforated member surrounding said at least one axial chamber.

* * * * *